United States Patent [19]

Fisher

[11] Patent Number: 4,460,062
[45] Date of Patent: Jul. 17, 1984

[54] DELAYED RESTRAINT RELEASE DEVICE FOR INFLATABLE ESCAPE SLIDES

[75] Inventor: John M. Fisher, Cuyahoga Falls, Ohio

[73] Assignee: The B. F. Goodrich Company, New York, N.Y.

[21] Appl. No.: 443,425

[22] Filed: Nov. 22, 1982

[51] Int. Cl.³ .......................... A62B 1/20; B65G 11/10
[52] U.S. Cl. ..................................... 182/48; 193/25 B
[58] Field of Search ................. 182/48, 49; 193/25 B; 244/DIG. 2

[56] References Cited

U.S. PATENT DOCUMENTS

| 3,018,867 | 1/1962 | Heyniger | 193/25 B |
| 3,391,771 | 7/1968 | Day | 182/48 |
| 3,463,266 | 8/1969 | Day | 182/48 |
| 3,606,939 | 9/1971 | Summer | 244/DIG. 2 |
| 3,837,604 | 9/1974 | Matsuo | 244/152 |
| 3,897,861 | 8/1975 | Miller | 182/48 |
| 3,944,023 | 3/1976 | Fisher | 182/48 |

Primary Examiner—Reinaldo P. Machado
Attorney, Agent, or Firm—M. J. Colitz, Jr.

[57] ABSTRACT

A strap restrains full extension of an evacuation slide until a bag on the slide inflates to extend and unlace a cord to separate the strap coupling the restrained segments of the slide. The device is especially useful as a back-up restraint in escape slides of the dual chamber variety wherein the inflation of one but not the other of the chambers will not create sufficient pressure to break a primary restraint device employing shear pins separable by a predetermined pressure being attained in the inflatable slide chambers.

4 Claims, 5 Drawing Figures

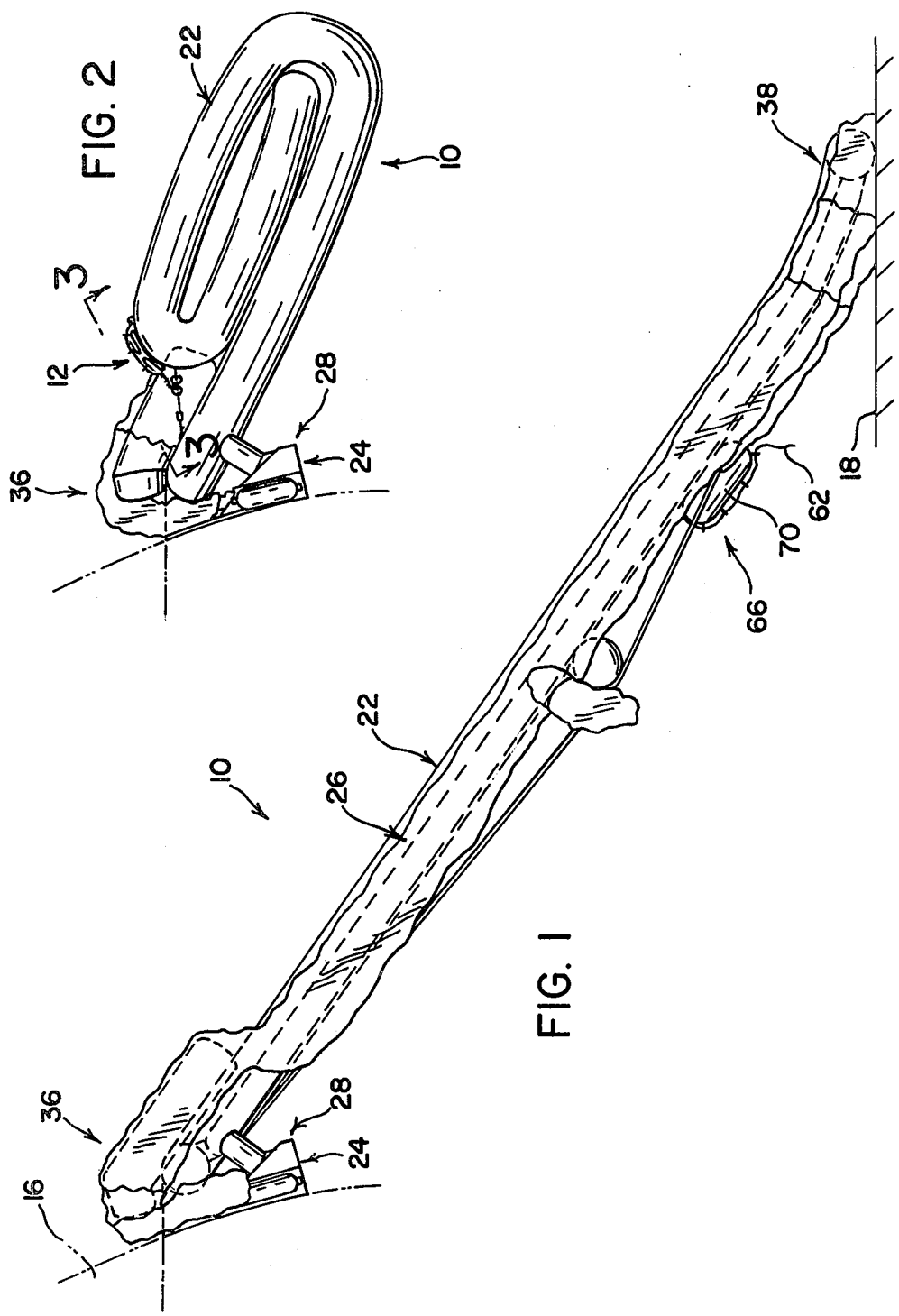

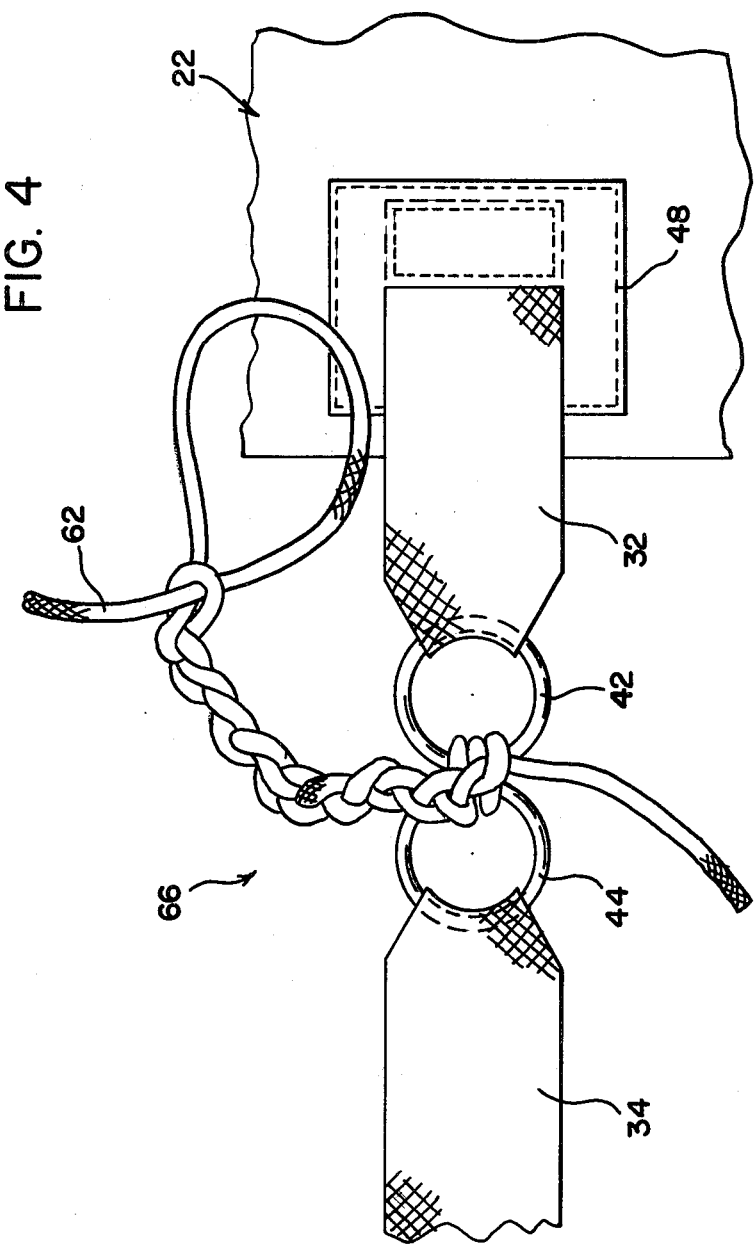

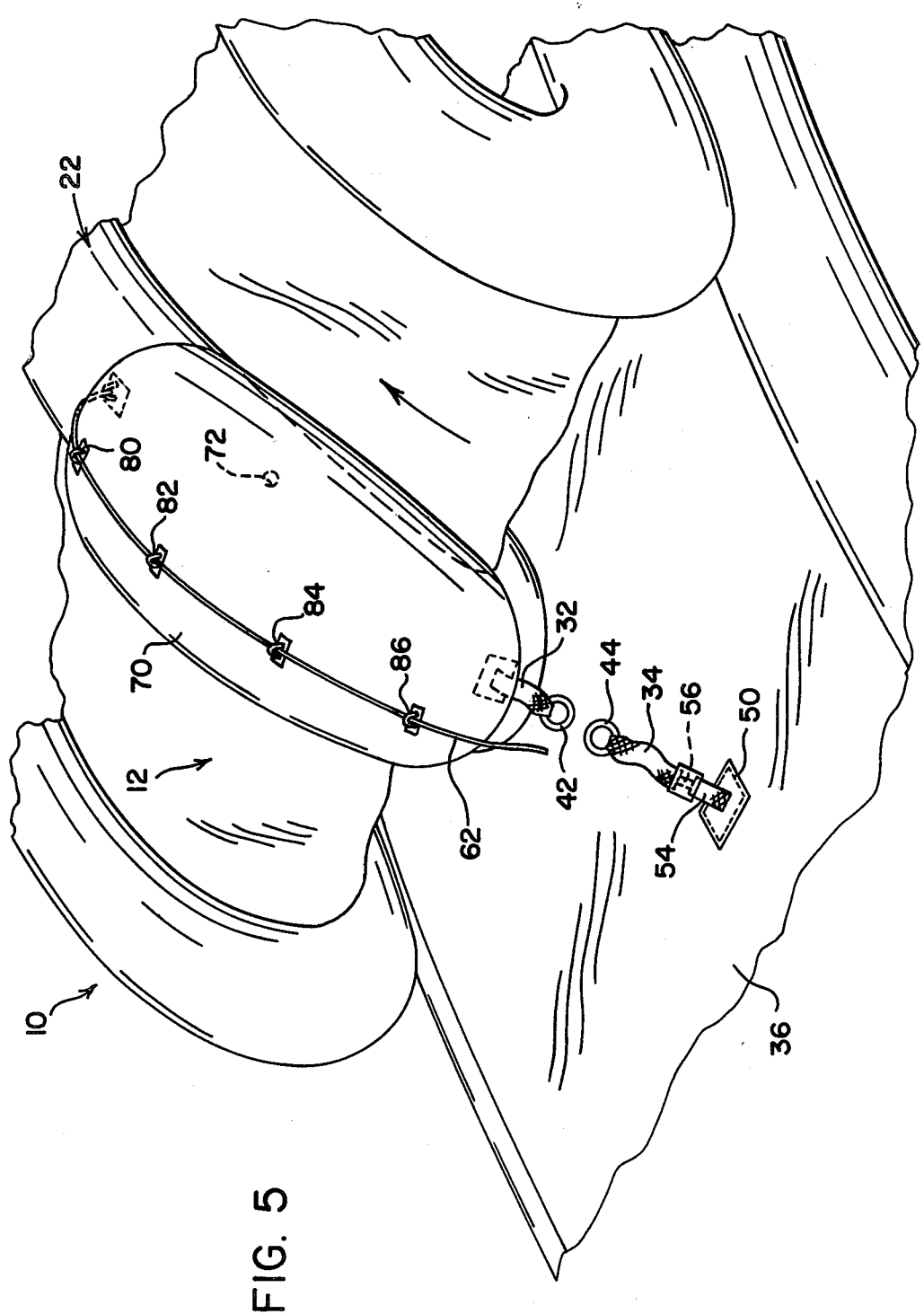

DELAYED RESTRAINT RELEASE DEVICE FOR INFLATABLE ESCAPE SLIDES

BACKGROUND OF THE INVENTION

This invention relates to inflatable emergency evacuation slides used primarily on off-shore drilling platforms, aircraft, and the like and particularly to delayed restraint release devices used in conjunction with the deployment of these slides.

In the case of crash landings or other aircraft emergencies away from an airport terminal building it is desirable to evacuate the passengers and cargo as quickly as possible. Emergency evacuation slides have been provided on most aircraft for this purpose. Presently, the most common type of evacuation slide used in an inflatable ramp which is stored in its deflated condition. In emergencies the deflated slide is extended from the aircraft and inflated. When the slide is extended from the aircraft it hangs in a relatively limp position. In this position it is highly vulnerable to wind deflection which occurs when a cross wind blows toward the evacuation exit. In such circumstance the limp slide may be blown underneath the aircraft or elsewhere, thus making it completely useless when inflated. For further discussion of this problem, see U.S. Pat. No. 3,018,867.

To eliminate the problem created by wind deflection, devices have been used to restrain the full extension of the slide until it is partially inflated to a predetermined degree. In many such devices an area of the slide adjacent the lower end is secured to the upper end or to the aircraft until a suitable inflation pressure is obtained. Upon release of the lower end of the slide, the inflation pressure forces the lower end to first swing outwardly from the air-craft and then downward to the ground. Further discussion of the mechanism can be found in U.S. Pat. No. 3,391,771.

Preferably the delayed restraint release device used to secure the lower end of the slide is self releasing when full extension of the slide is advantageous. A self-releasing restraint element eliminates human error due to panic or lack of skill.

It is preferable that the restraint device be released at a precise inflation pressure. Deviation from this pressure can render the slide useless. Release of an underinflated slide may cause wind deflection problems heretofore discussed. On the other hand, undue delay in fully extending the slide can be disasterous in a situation where time is of the essence. The restraint device which is set to release at an inflated pressure that will never be attained will also render this slide useless.

One such type releasable restraint which achieves the desired objective as set forth above and overcomes such disadvantages is described in U.S. Pat. No. 3,944,023. According to that disclosure, an emergency evacuation slide is precluded from full extension by the presence of a shear pin breakable only upon the attainment of a predetermined pressure in the slide. Such releasable restraint normally comprises two mated components coupled by the shear pin or pins with a cover protecting the pins. Tension due to the inflation pressure within the slide is transmitted to the restraint device and shear pins by means of two straps, each of which couples an end of the component with a segment of the slide. Only when the pressure within the slide reaches a predetermined pressure limit will the shear pin break and release the slide to permit full extension to the position for utilization.

However, complications may arise when using such type of a restraint device in an inflatable emergency evacuation slide composed of two fluidly independent inflatable chambers. Such type of emergency evacuation slide is employed for example in the stretch upper deck of the Boeing 747 aircraft and is described in U.S. patent application Ser. No. 443,424 filed concurrently herewith in the name of John M. Fisher. Such complications would occur if the pneumatic inflation mechanisms for only one of the inflatable chambers were actuated while the other remained unactuated or if the tubing of one of the chambers were to rip to preclude inflation.

In the situation where the lower chamber only would inflate, insufficient pressure build-up would occur to break the shear pin or pins of the primary emergency restraint release device of the aforementioned U.S. Pat. No. 3,944,023. If such a situation were to occur, a secondary or back-up delayed restraint device must be utilized to insure deployment of the slide even though the upper chamber were not to become inflated.

Such back-up delayed restraint release device may be used, not only in a back-up mode as disclosed herein, but also, if desired, as a primary releasable restraint independent of other devices whereby it would constitute as the sole delayed restraint release device in inflatable emergency evacuation slides.

SUMMARY OF THE INVENTION

It is, therefore, an object of the present invention to timely deploy an inflatable emergency evacuation slide through a dependable delayed restraint device that will release the slide at a precise predetermined inflation pressure but which, if the pressure build-up within the evacuation slide is not attained for one reason or the other, will release the slide for deployment through a back-up restraint device.

It is the further object of this invention to deploy an inflatable slide in emergency situations with a releasable restraint device which actuates independent of the pressure within the emergency evacuation slide with which it is utilized.

It is yet a further object of the present invention to restrain full deployment of a dual chamber emergency evacuation slide with a restraint device releasable at an appropriate time whether or not one or both of the inflatable sections are inflating.

These and other objects of the present invention are attained through the elongation of a laced cord coupling two strap segments. Each strap segment is coupled to an inflatable evacuation slide portion at their extremities and to the laced cord adjacent intermediate portions. The cord is elongated and unlaced to release the strap segments through the inflation of a bag pneumatically coupled with the slide. Further objects and advantages will become apparent upon a reading of the following detailed description of the invention when read in association with the accompanying drawings.

BRIEF DESCRIPTION OF THE DRAWINGS

FIG. 1 is a side elevational view of an inflatable emergency evacuation slide of the dual chamber variety with the upper chamber uninflated, a condition in which the present invention may be employed.

FIG. 2 is a side elevational view of the same emergency evacuation slide as shown in FIG. 1 but in a semi-deployed condition showing the restraint device restricting full extension of the evacuation slide.

FIG. 4 is an enlarged showing of the laced cord and strap arrangement as shown in FIG. 3.

FIG. 5 is a view similar to FIG. 3 of the releasable restraint device but with the bag in the inflated condition immediately prior to full deployment of the evacuation slide.

DESCRIPTION OF THE PRESENTLY PREFERRED EMBODIMENT

Figure 3:
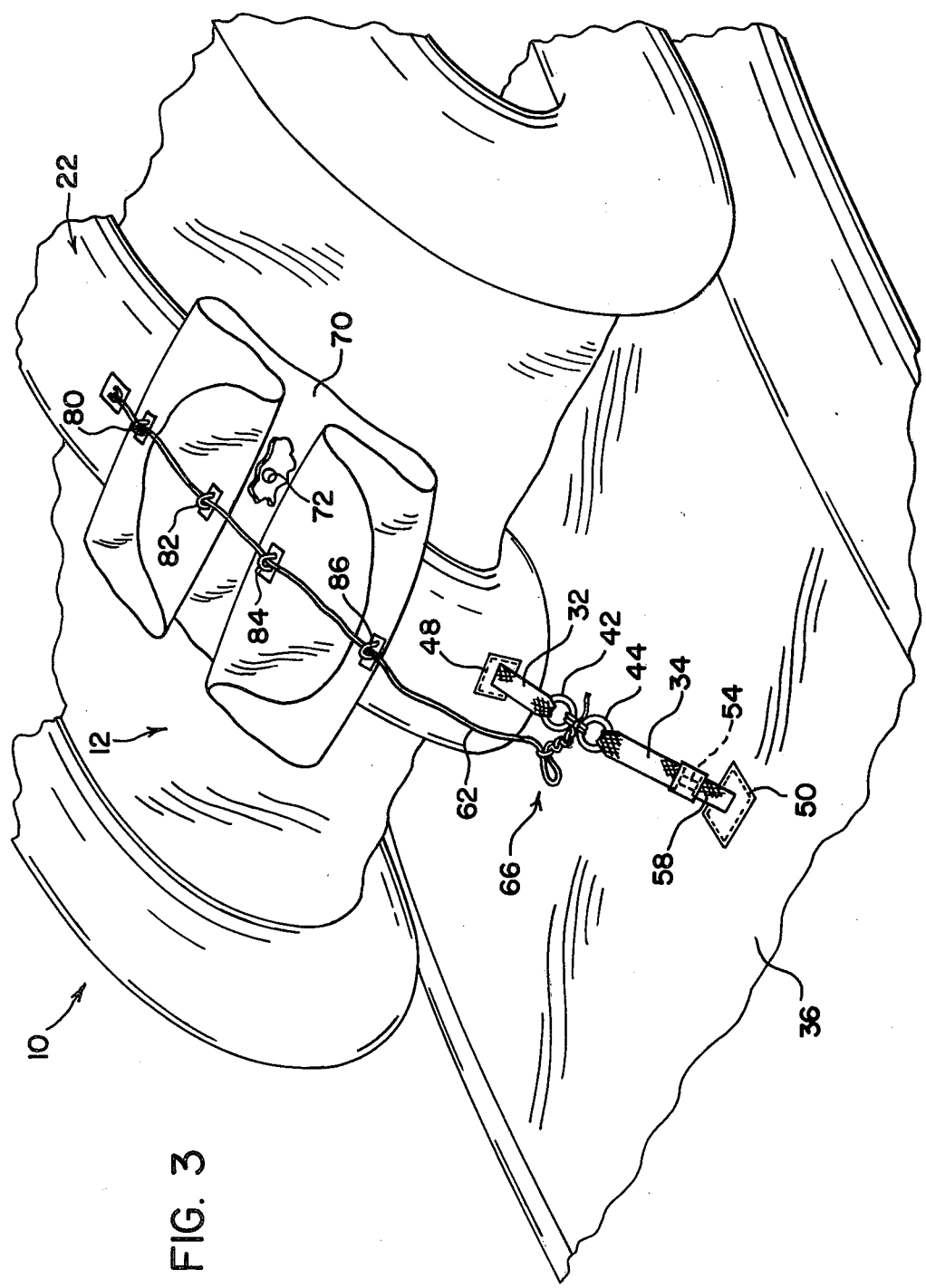
FIG. 3 is an enlarged perspective view of the restraint device as shown in FIGS. 1 and 2 prior to the inflation of the supplemental bag which unlaces the cord to permit full deployment of the slide.

Referring now to the figures, an inflatable emergency evacuation slide 10 is shown. In FIG. 1 it is in the deployed orientation after having been released through the separation of the delayed restraint release device 12 associated with the slide. In FIG. 2 it is in a semi-deployed state. The particular evacuation slide disclosed herein is that which could readily be employed on the stretch upper deck of the Boeing 747 aircraft, extendable from the stretch upper deck door opening 16 down to the ground 18. This slide is described in the aforementioned U.S. patent application Ser. No. 443,424 filed concurrently herewith in the name of John M. Fisher.

For the purposes of this description, the slide is shown with only the lower chamber 22 inflated by inflation source 24 and not the upper chamber 26 inflated as might occur if inflation source 28, coupled with the upper chamber, were to be inoperative upon deployment or if the tubing of the upper chamber were to be ripped rendering it incapable of maintaining sufficient pressure therein for deployment. It is in such a situation that the present delayed restraint release device has its greatest utility.

FIG. 2 illustrates the slide 10 is its semi-deployed or, as it were, semi-retracted position. A pair of straps 32 and 34 are utilized, one of which, 34 in association with strap 58, couples the slide adjacent the head 36 of the slide adjacent the aircraft with the restraint release device. The other strap 32 couples the restraint release device to the slide adjacent an outboard portion near the foot portion 38 of the slide. Devices such as clevises or rings 42 and 44 are coupled to the interior ends of the straps 32 and 34 while the outboard ends are stitched to the slide at 48 and 50, strap 34 being effectively stitched through its coupling with strap 58. This arrangement with the restraint release device is to restrict the inadvertent movement of the slide 10 prior to sufficient inflation and avoid the problems as described above in the background of the invention.

Intermediate the interior ends of the straps 34 and 58 there is located the primary delayed release restraint device 54 as described in U.S. Pat. No. 3,994,023 referred to above. The primary restraint release device 54 is coupled to strap 58 and to intermediate strap 34 which in turn is coupled to rings 44 and 42 through cord 62 to thus constitute the back up delayed restraint release device.

Under normal conditions with both chambers of the slide inflating properly, or with the upper chamber of the slide only inflating properly, sufficient tension will be built up in the slide to create ample force to break the shear pins in the primary delayed restraint release device 54 for proper full deployment as shown in FIG. 1.

In those situations, however, where the lower slide only inflates for one reason or the other, insufficient pressure will be created in the slide to break the shear pins and full deployment will not occur unless a back-up or secondary delayed restraint release device 66 as described herein is utilized. A key element in the secondary delayed restraint release device 66 is found in the utilization of a second separable zone between the straps 32 and 34 coupling the slide at stitching points 48 and 50 to hold the slide in the semi-deployed condition. This second separable zone is in series with the first separable zone defined by the primary delayed restraint release device 54.

The second separable zone includes rings 42 and 44 releasably joined with cord 62 laced in a lanyard knot. The first end of the cord 62 is coupled to the slide preferably on the lower side of the slide so as to not cause problems during utilization of the slide by evacuatees. The lanyard knot is such an arrangement that upon pulling and extensioning of the cord 62, the lanyard knot will become unlaced to release and separate the straps independent of the separation of the primary delayed restraint release device which would normally be caused by the breaking of the shear pins of the release device 54.

The pulling and extensioning of the cord with its lanyard knot is effected through the use of a supplemental inflatable bag 70 normally contained in the retracted position as shown in FIGS. 2 and 3. The interior of the supplemental bag is in pneumatic communication with the lower chamber 22 of the evacuation slide 10 through a hole 72. Hole 72 is about ½" in diameter, essentially centrally located in pneumatic communication between the inflatable bag 70 and the lower chamber 22 of the slide 12. The bag is preferably about 14" in diameter when expanded and about 30" long transverse to the axial center line of the slide.

In the event that the lower chamber is inflated, the supplemental bag will become sufficiently inflated to fully inflate the bag and extend the cord to unlace the lanyard knot to permit full extension of the slide within two to three seconds after the primary release device should have been broken had the upper or upper and lower chambers been properly inflated. The fully inflated bag is shown in FIGS. 1 and 5 after the lanyard knot on the cord has released the separable connection at the rings 42 and 44.

Also located on the exterior of the supplemental bag are a plurality of guide rings 80, 82, 84 and 86 stitched or otherwise secured to the bag through which the cord is trained to insure that the lanyard cord does not extend around or otherwise interfere with the inflation of the supplemental bag or that the bag does not become inflated without properly applying tension to the cord to extend it and unlace the lanyard knot and thereby permit deployment of the evacuation slide.

In the event that both chambers of the slide evacuate properly, the slide will be released through the separation of the primary device 54. However, the supplemental bag 70 will still inflate but at a later time, to eventually separate rings 42 and 44 and assume an orientation as shown in FIG. 1.

This type of supplemental delayed restraint release device has advantages over other delayed restraint release devices such as liquid filled devices in that it is not expensive, uses no viscosity sensitive liquid, uses no seals that can leak corrosive fluid and is light and requires little space.

While this instant invention was designed specifically for use within the stretch upper deck slide of the Boeing 747 aircraft, it has additional utility in that it can be used on any slide which may experience reduced breaking forces due to low temperature, low inflation bottle pressure and the like.

As can be understood from the foregoing, the secondary releasable restraint device afforded by the tie cord, rings, lanyard, supplemental bag, etc. could be utilized independent of a primary release restraint device as shown and disclosed herein. Its utility need not be limited as a backup wherein one of a plurality of chambers fails to become operational. In essence, it can be used as a substitute for the releasable restraint in an inflatable emergency evacuation slide as described in the aforementioned U.S. Pat. No. 3,944,023 to Fisher.

Although a structure of the type described for illustrating one embodiment of the invention is especially suitable for installation in aircraft, it should be understood, of course, that numerous modifications or alterations may be made therein without departing from the spirit and scope of the invention as set forth in the appended claims.

What is claimed is:

1. In an inflatable emergency evacuation slide, a delayed restraint release device comprising:
   strap means comprised of a plurality of strap segments, said strap means coupling remote portions of said evacuation slide to preclude full deployment of said slide;
   a cord having a first end attached to said slide and having a free second end, said cord being connected to said slide at an intermediate point along its length and having said free second end formed into a laced lanyard knot, said laced lanyard knot coupling strap segments of said strap means together at an intermediate point along said strap means; and
   supplemental bag means associated with said cord and pneumatically coupled with said slide and inflatable with the inflation of said slide to extend said cord and unlace said lanyard knot and thereby permit full deployment of said slide.

2. In combination with a multi-chamber inflatable emergency evacuation slide, a releasable restraint system including strap means containing a plurality of strap segments for securing together the head end of said slide with a point adjacent the foot end of said slide, said system comprising a primary delayed restraint release device intermediate said strap means and operative under normal conditions to restrain full deployment of said slide until a predetermined pressure has been built up within one of said chambers of said slide to uncouple adjacent strap segments of said strap means and permit full deployment of the slide, and a secondary delayed restraint release device intermediate said strap means operable under normal conditions to restrain full deployment of said slide temporarily and operable to permit full deployment of said slide only when said chamber of said slide that activates said primary delayed restraint release device is inoperable, said secondary release device including a cord coupled at one end to said slide and having a free second end laced in a lanyard knot to couple strap segments of said strap means together, and a supplemental bag means coupled with said cord and pneumatically coupled with a chamber of said slide that does not activate said primary delayed restraint release device for inflation therewith whereby said cord will become extended upon inflation of said supplemental bag means to unlace the lanyard knot and uncouple said strap segments coupled by said cord to thereby permit full deployment of said slide.

3. An inflatable emergency evacuation slide, including a delayed restraint device, said device adapted to restrain temporarily full deployment of said slide until a predetermined time, said device including:
   a first strap means coupled to a first portion of said slide;
   a second strap means coupled to a second portion of said slide remote from the said first portion of said slide;
   a cord having a first end attached to said slide and having a free second end, said cord being connected to said slide at an intermediate point along its length and having said free second end formed into a laced lanyard knot, said lanyard knot arranged to couple said first and second strap means; and
   a supplemental bag means inflatable with the inflation of said slide to extend the said cord and release the said lanyard knot to separate said first and second strap means and thereby permit full extension of the slide.

4. The apparatus as set forth in claim 3 and further including rings secured to said supplemental bag means and entraining said cord to preclude its entanglement.

* * * * *